United States Patent
Gupta et al.

(10) Patent No.: US 11,907,630 B1
(45) Date of Patent: Feb. 20, 2024

(54) POWER VALIDATION BASED ON POWER ASSERTION SPECIFICATION

(71) Applicant: Synopsys, Inc., Mountain View, CA (US)

(72) Inventors: Jitendra Kumar Gupta, Pleasanton, CA (US); Alexander John Wakefield, Fort Lauderdale, FL (US)

(73) Assignee: Synopsys, Inc., Mountain View, CA (US)

( * ) Notice: Subject to any disclaimer, the term of this patent is extended or adjusted under 35 U.S.C. 154(b) by 905 days.

(21) Appl. No.: 16/906,771

(22) Filed: Jun. 19, 2020

Related U.S. Application Data

(60) Provisional application No. 62/863,312, filed on Jun. 19, 2019.

(51) Int. Cl.
*G06F 30/20* (2020.01)
*G06F 30/331* (2020.01)
*G06F 16/9035* (2019.01)
*G06F 30/337* (2020.01)
*G06F 119/06* (2020.01)

(52) U.S. Cl.
CPC ........ *G06F 30/331* (2020.01); *G06F 16/9035* (2019.01); *G06F 30/337* (2020.01); *G06F 2119/06* (2020.01)

(58) Field of Classification Search
CPC .. G06F 30/331; G06F 16/9035; G06F 30/337; G06F 2119/06
See application file for complete search history.

(56) References Cited

U.S. PATENT DOCUMENTS

| 9,529,946 | B1 * | 12/2016 | Schumacher | G06F 11/3062 |
| 2004/0177328 | A1 * | 9/2004 | Sarkar | G06F 30/33 716/108 |
| 2008/0071513 | A1 * | 3/2008 | Chickermane | G01R 31/31721 703/15 |
| 2013/0305207 | A1 * | 11/2013 | Hsieh | G06F 30/367 716/136 |
| 2014/0327475 | A1 * | 11/2014 | Groot | H03K 17/22 327/143 |
| 2017/0147727 | A1 * | 5/2017 | Bickford | G06F 30/398 |

FOREIGN PATENT DOCUMENTS

| JP | 2003085233 A | * | 3/2003 | |
| JP | 2008186229 A | * | 8/2008 | |
| KR | 20060062752 A | * | 6/2006 | G06F 30/392 |
| WO | WO 2018068093 A1 | * | 4/2018 | G01R 19/2513 |

* cited by examiner

*Primary Examiner* — Kandasamy Thangavelu
(74) *Attorney, Agent, or Firm* — Haynes Beffel & Wolfeld LLP; Andrew L. Dunlap; Korbin S. Van Dyke

(57) ABSTRACT

A method is provided for performing power validation on an integrated circuit (IC) design based on a power assertion specification. The method includes receiving the power assertion specification for the IC design, where the power assertion specification includes a predicted power consumption. Power consumption of the IC design is estimated according to power assertions specified in the power assertion specification. The estimated power consumption is compared against the predicted power consumption included in the power assertion specification. The IC design is determined to be associated with a power assertion failure based on results of the comparing. In response to determining that the IC design is associated with the power assertion failure, the IC design is refined to remedy the power assertion failure.

20 Claims, 9 Drawing Sheets

```
RTL Code sample:

module count(clk, count);

input clk;
   output [7:0] count;

//--------------------------------------------------
   // Clock Counter
   //--------------------------------------------------
   reg   [7:0] count;
   initial count = 0;
   always @(posedge clk) count <= count + 1;

endmodule

Netlist Code Sample:

////////////////////////////////////////////////////////
// Created by: Synopsys DC Expert(TM) in wire load mode
// Version    : Q-2019.12-SP3
// Date       : Fri Jun  5 13:51:29 2020
////////////////////////////////////////////////////////
```

FIG. 2A

```
module count ( clk, count );
  output [7:0] count;
  input clk;
  wire  N0, N1, N2, N3, N4, N5, N6, N7;
  wire  [7:2] \add_11_S2/carry ;

HDBLVT08_FDPQ_V2Y2_2 count_reg_1_ ( .D(N1), .CK(clk), .Q(count[1]) );
  HDBLVT08_FDPQ_V2Y2_2 count_reg_2_ ( .D(N2), .CK(clk), .Q(count[2]) );
  HDBLVT08_FDPQ_V2Y2_2 count_reg_3_ ( .D(N3), .CK(clk), .Q(count[3]) );
  HDBLVT08_FDPQ_V2Y2_2 count_reg_4_ ( .D(N4), .CK(clk), .Q(count[4]) );
  HDBLVT08_FDPQ_V2Y2_2 count_reg_5_ ( .D(N5), .CK(clk), .Q(count[5]) );
  HDBLVT08_FDPQ_V2Y2_2 count_reg_6_ ( .D(N6), .CK(clk), .Q(count[6]) );
  HDBLVT08_FDPQ_V2Y2_2 count_reg_7_ ( .D(N7), .CK(clk), .Q(count[7]) );
  HDBLVT08_FDPQ_V2Y2_2 count_reg_0_ ( .D(N0), .CK(clk), .Q(count[0]) );
  HDBLVT08_INV_1 \add_11_S2/U2  ( .A(count[0]), .X(N0) );
  HDBLVT08_EO2_CBY2_2 \add_11_S2/U1  ( .A1(\add_11_S2/carry
[7]), .A2(count[7]), .X(N7) );
  HDBLVT08_ADDH_CBY2_1
\add_11_S2/U1_1_1  ( .A(count[1]), .B(count[0]), .CO(
        \add_11_S2/carry [2]), .S(N1) );
  HDBLVT08_ADDH_CBY2_1 \add_11_S2/U1_1_2  ( .A(count[2]), .B(
        \add_11_S2/carry [2]), .CO(\add_11_S2/carry [3]), .S(N2) );
  HDBLVT08_ADDH_CBY2_1 \add_11_S2/U1_1_3  ( .A(count[3]), .B(
        \add_11_S2/carry [3]), .CO(\add_11_S2/carry [4]), .S(N3) );
  HDBLVT08_ADDH_CBY2_1 \add_11_S2/U1_1_4  ( .A(count[4]), .B(
        \add_11_S2/carry [4]), .CO(\add_11_S2/carry [5]), .S(N4) );
  HDBLVT08_ADDH_CBY2_1 \add_11_S2/U1_1_5  ( .A(count[5]), .B(
        \add_11_S2/carry [5]), .CO(\add_11_S2/carry [6]), .S(N5) );
  HDBLVT08_ADDH_CBY2_1 \add_11_S2/U1_1_6  ( .A(count[6]), .B(
        \add_11_S2/carry [6]), .CO(\add_11_S2/carry [7]), .S(N6) );
endmodule
```

FIG. 2B

POWER VALIDATION BASED ON POWER ASSERTION SPECIFICATION

PRIORITY APPLICATION

This application claims the benefit of U.S. Provisional Patent Application No. 62/863,312 filed 19 Jun. 2019; which application is incorporated herein by reference.

TECHNICAL FIELD

The present disclosure relates to power assertion, power validation, and dynamic power validation methodology.

BACKGROUND

In modern SoC (system-on-chip) designs, power profile is becoming a very critical aspect of SoC suitability for overall system design and in some cases, possibly as important as device functionality itself. An adverse power profile in an SoC device can cause its functional failure (thermal meltdown), reduced performance (device operating at higher temperature than estimated or clock frequency reduction caused by power management circuit), lower battery life and possibly reduced overall system value.

Hence, SoC designers validate a SoC design or sub-block power profile using both average power as well as peak power analysis over critical time windows. Some of the functional tests are created specifically for validating high-activity or high-power mode of the design and validated with both average power and peak power analysis. However, such methods are manual analysis, tedious and error-prone. When the SoC design and the software content being run on such designs are evolving continuously, it is quite possible for power bugs to escape validation based on tests created earlier in the design cycle. Additionally, both the completeness of functional tests and assumptions made at the time of creating functional tests can be suspect, which further increases the risk of power bugs escaping even a reasonably well-defined and well-executed power validation methodology.

Existing power estimation tools in industry have a capacity and accuracy limitation. For this reason, existing design methodology is to perform power validation on small design blocks with small functional tests, typically no more than 1 million cycles of simulation. Hence, users have been able to validate power with ad-hoc and manual methods.

With adoption of emulation-based verification methodology, users are now able to run tests which are several thousand times longer, and on complete SoC designs which can be hundreds of times bigger than small functional blocks. Power estimation tools are also evolving rapidly for higher accuracy and capacity to match emulation datasets for full SoC designs.

For such orders of magnitude larger amount of power profile data, ad-hoc or manual inspection method will not suffice. Above challenges indicate the need for an automated and robust power validation methodology. Given the size of SoC designs (billions of logic gates) and size of software content being run on such SoC designs (billions of cycles), it is necessary that power validation methodology can scale easily to extremely large datasets typically generated by emulator-based SoC validation flow.

SUMMARY

A method is provided for performing power validation on an integrated circuit (IC) design based on a power assertion specification. The method includes receiving, by a processor, a power assertion specification for the IC design, where the power assertion specification includes a predicted power consumption. Power consumption of the IC design is estimated according to power assertions specified in the power assertion specification, by the processor. The estimated power consumption is compared against the predicted power consumption included in the power assertion specification, by the processor; The IC design is determined to be associated with a power assertion failure based on results of the comparing. In response to determining that the IC design is associated with the power assertion failure, the IC design is refined to remedy the power assertion failure, by the processor. The results of the comparing is stored in a power assertion database, and the power assertion failure, along with power assertion successes, is reported based on the results stored in the power assertion database. The refining the IC design can include generating, by the processor, directives to remedy the power assertion failure in a part of the IC design associated with the power assertion failure. The directives can include synthesis directives, clock-gating directives, and placement directives to remedy the power assertion failure.

The IC design can be represented by an optimized netlist that includes a subset of design signals in the IC design, and the power assertion specification includes a predicted toggle rate. An original netlist of the IC design is optimized for emulation/simulation purposes to produce the optimized netlist. Emulation/simulation of the IC design can be executed using the optimized netlist stored in a hardware design database to output waveforms for the subset of design signals. Toggle rate of signals in the subset of design signals can be calculated during the operation for executing emulation/simulation, using the output waveforms for the subset of design signals, for a subset of the power assertions specified in the power assertion specification dependent on the signals in the subset of design signals. The calculated toggle rate of the signal in the subset of design signals can be compared against a predicted toggle rate of the signals for the subset of power assertions during the operation for executing emulation/simulation. The output waveforms for the subset of design signals can be stored in an output waveform database.

Signals in the IC design that are not in the subset of design signals can be reconstructed using the output waveforms for the subset of design signals stored in the output waveform database. Toggle rate of the reconstructed signals can be calculated during the operation for reconstructing the signals, for a subset of the power assertions specified in the power assertion specification dependent on the reconstructed signals. The calculated toggle rate of the reconstructed signals can be compared against a predicted toggle rate of the signals for the subset of power assertions during the operation for reconstructing the signals.

Power consumption in a circuit block in the IC design can be calculated using design waveforms stored in a design waveform database and physical design data stored in a physical design database, for a subset of power assertions specified in the power assertion specification dependent on the circuit block. The calculated power consumption of the circuit block can be compared against a predicted power consumption for the subset of power assertions during the operation for calculating power consumption.

Power consumption in a circuit block in the IC design can be calculated using power waveforms stored in a power waveform database, for a subset of power assertions specified in the power assertion specification dependent on the circuit block. The calculated power consumption of the circuit block can be compared against a predicted power consumption for the subset of power assertions during the operation for calculating power consumption.

The power assertion specification can include power assertions including expected average power consumption and expected peak power consumption of a circuit block in the IC design. The power assertion specification can include expected leakage power, expected switching power and expected internal power of a circuit block in the IC design. The power assertion specification can include power assertions including expected toggle rate of a design signal in the IC design.

The power assertion specification can include power assertions including a time period during which to measure power consumption or toggle rate. The power assertion specification can include power assertions including a power condition, a power trigger and a design state at which to measure power consumption or toggle rate. The power assertion specification can include power assertions including an absolute specification, a relative specification and a predicted power specification for expected power values. The power assertion specification can include a plurality of power assertions, each power assertion being categorized based on importance according to which the power assertion is reported.

A system and a non-transitory computer readable medium are also provided for performing power validation on an integrated circuit design based on a power assertion specification as described herein.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 2A and 2B depict example hardware design code.

DETAILED DESCRIPTION

Aspects of the present disclosure relate to performing power validation based on a power assertion specification. Given the size of SoC (System on Chip) designs (billions of logic gates) and size of software content being run on such SoC designs (billions of cycles), ad-hoc and manual power validation methods are relatively poor choices for developing accurate power profiles.

The present technology provides a systematic and automatic method by which SoC or block designer can specify a power assertion specification including the expected power profile of their design component. Such specification is of a form that any subsequent power validation tool can measure the estimated power profile and compare it against designer-specified expected power profile. If there is a mismatch in the measured power profile vs. expected power profile, a power assertion failure is reported for each such occurrence, and a correction can be generated to correct the power assertion failure in the integrated circuit design, in the power assertion specification, and/or in the software content.

The technical advantages of the present technology include improvements in the size of SoC designs (a full SoC design vs a functional block which can be 100× smaller) that can be fully analyzed with respect to power, improvements in the size of software content being run on such SoC designs (billions of cycles vs 1 million cycles in simulation) for analyzing power, and improvements in the circuit design and redesign in response to power analysis. This results in more power efficient manufactured integrated circuits. Using the present technology, performance in the manufactured integrated circuits can be improved by operating at power consumption by design instead of at higher power consumption than by design. Using the present technology, functional failures (thermal meltdown) due to undetected adverse power profile can be reduced in the manufactured integrated circuits. Using the present technology, design/verification cycles can be shortened resulting from a systematic and automatic method instead of an ad-hoc and manual method. Battery life can be increased due to higher power efficiency in the manufactured integrated circuits designed and verified using the present technology.

As used herein, a cycle can refer to a clock period of a primary clock signal driving a logic block. For example, a clock period from a rising edge to a subsequent rising edge in a primary clock signal is one cycle. In complex IC designs with multiple clocks, user can define and choose an artificial clock (or virtual clock) with fixed period such as 1 ns or 10 ns, instead of a design clock. In such case, a "cycle" will mean the clock period of such artificial/virtual clock.

Figure 1:
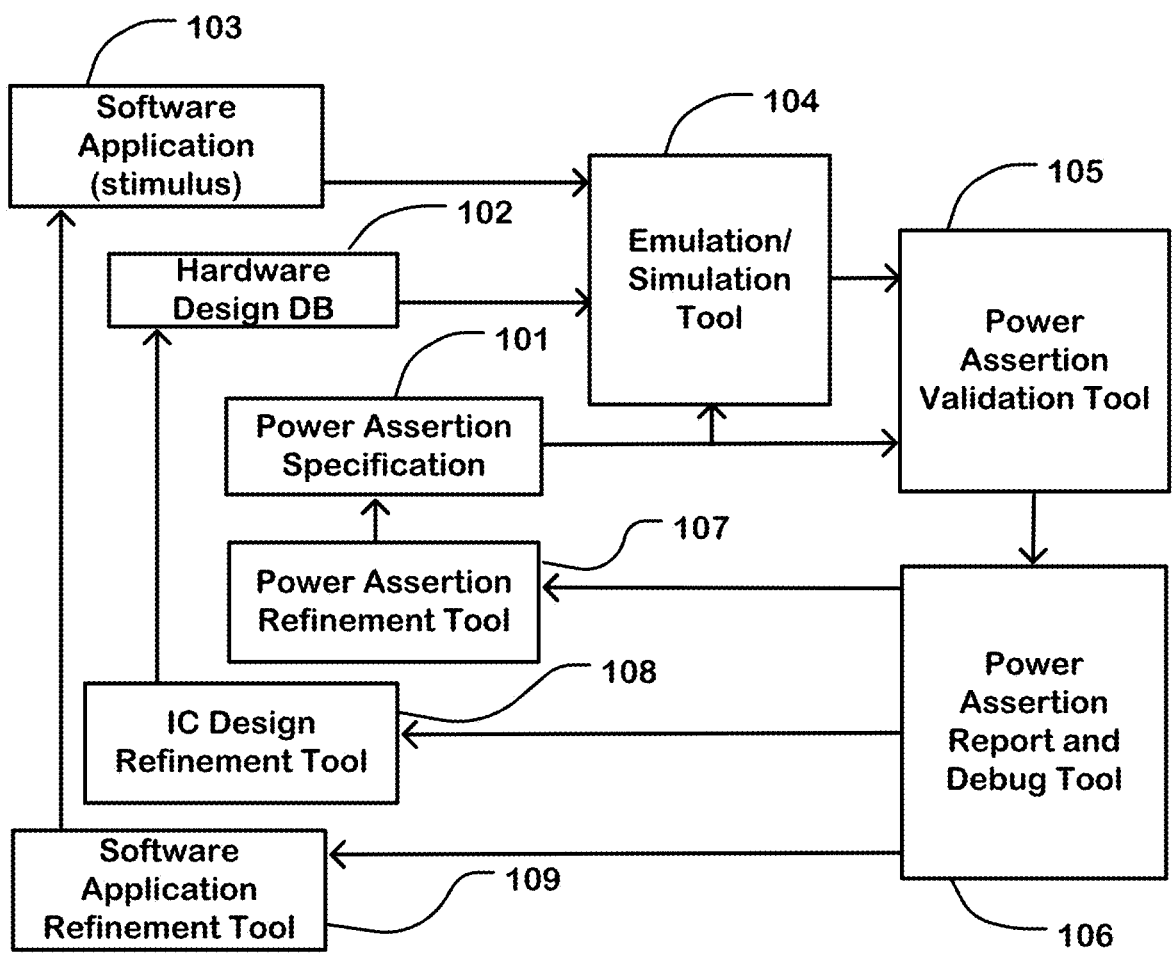
FIG. 1 depicts a block diagram of a method for performing power validation based on a power assertion specification.

FIG. 1 depicts a block diagram 100 of a method for performing power validation based on a power assertion specification. The block diagram includes power assertion specification 101, hardware design database (DB) 102, software application 103, emulation/simulation tool 104, power assertion validation tool 105, a power assertion report and debug tool 106, power assertion refinement tool 107, IC design refinement tool 108, and software application refinement tool 109.

Power assertion specification 101 is a user-created specification of the power profile expectation for a given hardware-software system. Various aspects of power assertion specification are described herein. The actual syntax for the power assertion specification will vary from one embodiment to another. Language used for power assertion specification will align with (i) the design hardware description language, (ii) power assertion validation tool control language, and/or (iii) software or emulation system specification language.

The power assertion specification includes multiple separate statements of power assertions for different aspects of hardware design, different modes of software application, and different metrics associated with power profile. Detailed description of these aspects is provided herein. The power assertion specification can be contained in one source file or multiple source files, and can be separate source description or embedded in existing design/software/tool setup sources. In general SoC context, software application refers to a collection of software stack typically containing of "Operating System, Operating System libraries, application libraries and user application itself". User application can control what is a desired quality of service (QoS) requirement; e.g. a "live-video application" (a mode of software application) that will maintain throughput with occasional degradation in video quality; vs. "Offline video processing application" (another mode of application) that will maintain quality without regard to lapse time. Here "live-video application" and "offline video processing application" are examples of different modes of software application.

Hardware design database (DB) 102 includes standard hardware design description input to an emulation or simulation system, such as depicted in FIGS. 2A and 2B. Hardware design specification can represent any state of design model, including but not limited to system-level, behavioral, generic netlist, placed netlist or a combination of these. In addition, Hardware design specification can include associated design data such as power intent described in UPF (Unified Power Format) or similar format, design timing constraints, design library, embedded IP blocks and so on. UPF is an industry standard that allows hardware/IC designers to specify power aspects of their RTL design and help with design implementation and design verification aspects.

FIGS. 2A and 2B depict example hardware design code.

Power assertion does not require any modification to hardware design specification. In the embodiment where hardware design language used for hardware design specification can also be used to create power assertions, such power assertions can be combined with hardware design specification.

Software application 103 is standard software application code input through a testbench to an emulation or simulation system. Power assertion does not require modification to software or testbench specification. However, in one or more embodiment of the present technology, it is possible to enhance software specification to (i) add references in application code that can be used both for power assertion creation and power assertion debug, and (ii) use software application language to create power assertions.

Emulation/simulation tool 104 is any existing or future emulation and/or simulation tool that can be used to model and validate a hardware-software system design. Power assertion specification does not require any modification to existing emulation or simulation tool used. However, in one or more embodiments of the present technology, it is possible to leverage emulation/simulation system to validate power assertion specification due to advantage of better performance or overall ease of use. Emulation/simulation tool 104 is further described in reference to FIG. 3.

Power assertion validation tool 105 includes engines to read and validate the power assertion specification 101. It is coupled with the emulation/simulation tool 104 used in any embodiment of the present technology, and hence, has access to relevant hardware design description, software (application code) description, or derived data contained within or output by the emulation/simulation tool 104. The implementation of power assertion validation tool 105 is linked with the power assertion specification 101 and the emulation/simulation tool 104 used in a given embodiment of the present technology. Power assertion validation tool 105 is further described in reference to FIG. 4.

Power assertion report and debug tool 106 reports results of validating power assertions in the power assertion specification 101 on given hardware-software system. A power assertion report can be a simple pass-fail report, where a failed assertion is reported for each individual power assertion in the power assertion specification for each such occurrence. In one or more embodiments of the present technology, there will a detailed debug tool that provides user-interface to debug each such assertion failure, and to find the root-cause of such failure and correction needed in power assertion specification, hardware design description, or software (application code), or a combination of these.

Power assertion refinement tool 107 can be used when root-cause of a failed power assertion indicates an error in power assertion specification created by user. For example, debug of power assertion failure can indicate that power estimated for given hardware design module during a specific software/design operation mode is correct, and expected result as defined in a power assertion is incorrect.

In such case, based on a power assertion report, 1) in a manual mode, user can update the power assertion specification to correct the power assertion failure; 2) in a tool-guided mode, the power assertion refinement tool 107 can suggest tool fixes to correct the power assertion failure in the power assertion specification, and prompt the user to accept the suggested tool fixes; and 3) in a fully automatic mode, the power assertion refinement tool 107 can generate directives for the power assertion specification to correct the power assertion failure. After correction in either of the three modes, the power assertion validation tool can be re-run on a given hardware-software system using the corrected power assertion specification.

As used herein, a design operation mode can refer to a specific mode in which a hardware block in an IC design may be operating. For example, the modem block in a Mobile SoC may operate in any of following modes: Off (power sleep mode); (ii) Idle—listening for device/network interrupt; (iii) Transmitting text packet; (iv) Transmitting voice call; and (v) Transmitting video call. Because of different throughput/latency requirements, each "design operation mode" may have a different power profile and a different power assertion specification.

IC design refinement tool 108 can be used when root-cause of a failed power assertion indicates an error in design description. For example, debug of power assertion failure can indicate that certain hardware design logic is not gated during a specific software/design operation mode, and hence, causes estimated result to not match expected result as defined in power assertion.

In such case, based on a power assertion report, 1) in a manual mode, user can update the design to add suitable gating logic; 2) in a tool-guided mode, the IC refinement tool 108 can suggest hardware design fixes to correct the power assertion failure, and prompt the user to accept the suggested design fixes; and 3) in a fully automatic mode, to correct the power assertion failure, the IC design refinement tool 108 can generate synthesis directives to select power efficient architecture of design macros, or to generate placement directives to optimize power QoR (Quality of Results) for certain design sections. After correction in either of the three modes, the power assertion validation tool can be re-run on a given hardware-software system using the corrected hardware design.

Software application refinement tool 109 can be used when root-cause of a failed power assertion indicates an error in software application code. For example, debug of power assertion failure can indicate that certain application code is not aligned with required hardware requirement, and hence, causes unexpected power consumption.

In such case, based on a power assertion report, 1) in a manual mode, user can update the software code to match hardware control requirement; 2) in a tool-guided mode, the software application refinement tool 109 can suggest software code fixes to match hardware control requirement in order to correct the power assertion failure, and prompt the user to accept the suggested software code fixes; and 3) in a fully automatic mode, to correct the power assertion failure, the software design refinement tool 109 can generate software code fixes to match hardware control requirement in order to correct the power assertion failure. After correction in either of the three modes, the power assertion validation tool can be re-run on a given hardware-software system using the corrected software code.

Power Assertion Specification

A power assertion specification includes various "power assertions," which can include three parts with respect to power analysis and validation: 1) what to measure; 2) when to measure; and 3) expected result of measurement (or predicted power consumption).

The "what to measure" part of a power assertion specification describes the power metric that is to be measured for specified part of design. As used herein, the term "measurement" refers to estimation of specified power metric using a suitable model of the design. A suitable model can be a register transfer level (RTL) or gate-level model of the design, or an intermediate implementation model of the design such as placed and routed model created by a place and route (P&R) tool.

Estimation of power metrics can be done in either the emulation/simulation tool 104 or the power assertion validation tool 105, depending on types of metrics to be calculated. Some metrics, for example, toggle count of registers or power-critical signals, can typically be done in the emulation/simulation tool as these are relatively easy to calculate and can reduce output needed from the emulation/simulation tool. Some other metrics, for example peak-power, internal-power, and switching-power, involve more detailed calculations, and hence are not measured by the emulation/simulation tool 104. In such case, they can be measured by the power assertion validation tool 105, which will perform power estimation (calculation) and power assertion validation concurrently.

Several power metrics can be used to measure power profile of any design part. Some commonly used power metrics are as below:
1). An average power metric, which indicates the power consumption of specified design part when averaged over specified duration. The duration of measurement is defined by "when to measure" specification. Average power metric usually includes sub-components such as leakage power, switching power and internal power. However, a power assertion specification can be specified for a specific power sub-component as well.
2) A peak power metric, which indicates the maximum power consumption of specified design part when maximum value is monitored over specified duration. The duration of measurement is defined by "when to measure" specification. Peak power can be measured over 1 cycle (total energy in 1 cycle divided by duration of cycle), moving peak value over N cycles (total energy in any consecutive N cycles divided by duration of N cycles), or moving peak value over specified time duration (say, 1 μs). Peak power metric usually includes sub-components such as leakage power, switching power and internal power. However, a power assertion specification can be specified for a specific power sub-component as well.
3) A weighted toggle count power metric, which indicates the weighted sum of toggle counts within specified design part, where a weight is assigned by design analysis algorithm to each output terminal of each instance in specified design part. Similar to power metric, weighted toggle count can be measured either as average over specified duration, or peak value over 1 or more cycles.

In addition to specifying the power metrics to be measured, the power assertion specification also describes the scope of the design where such metric is measured. A design can contain several different power assertion specifications, each with a different power metric and different design scope as suitable. In one embodiment of the present technology, instead of being defined in separate source files, a power assertion can be embedded within the existing hardware design description source files, using the language extensions or embedded meta-comment as suitable. This makes the version control easier. For example, hardware design description may have two versions of logic description as below:

'ifdef SELECT_CONTRL_SPEC_1
  . . . Description of logic specific to method per user spec #1
  <Add power assertion named "PA_TOPBLK1_KEYSIG1" here>
  which uses control signal "Top.blk1.ctl1200_enable"
'else
  . . . Description of logic specific to method per user spec #2
  <Add power assertion named "PA_TOPBLK1_KEYSIG1" here>
  which uses control signal "Top.blk1.engineXmode_enable"
'endif Each version has slightly different logic design ("user spec #1" vs "user spec #2"), and hence, design signals ("Top.blk1.ctl1200_enable" vs "Top.blk1.engineXmode_enable") needed for power assertion specifications are different too.

The scope of design for which a power assertion is specified can include, but is not limited to: a) full SoC design; b) an IP sub-system inside an SoC design; c) either a logical hierarchy or physical hierarchy of a hierarchical design; d) specific set of one or more design instances (such as memory or IP instances); e) specific (logical) part of design such as clock network, sequential elements, or combinational elements; f) specific physical location such as a set of one or more physical tiles (from a grid map) or a set of one or more arbitrary size rectangular regions in the placement/layout view of the design; and g) combination of two or more of above methods.

The "when to measure" part of a power assertion specification identifies one or more time-windows when assertion is checked during the complete software/emulation run of the SoC design. It can be defined by multiple methods, including but not limited to: a) a power condition specification based on logical expression of one or more critical power signals. Power assertion is checked while the condition is true; b) a power trigger specification based on specified edge (or pulse) on logical expression of one or more critical power signals. Power assertion is checked either for fixed N cycles after such trigger occurs, or until a related terminating trigger signal is received; and c) a design power state based on UPF or similar power intent specification of the design.

The "power intent specification" refers to specification typically described using the IEEE standard "UPF" (Unified Power Format) language. In contrast, the "power assertion specification" is a new specification in the present technology as described herein, and not existing in the UPF language. A design power state refers to a state of an IC design with emphasis on power profile. For example, a design power state can refer to a state when power is switched off to certain logic blocks, or a state when certain logic blocks are operating on lower voltages.

Further, the "when to measure" part of the power assertion specification can be defined by d) a design state derived directly from the software state. For example, software executing a specific step in application code, or operating at a certain throughput (e.g. number of packets per second). A design state refers to a state of an IC design but not necessarily emphasizing a power state. For example, a design state can refer to a logic block in test scan mode or self-test mode. A software state refers to a state of a hardware/software system where application primarily determines a design state. For example, if there is a screen lock on a mobile phone, some applications may put design in pause mode even though from design/hardware data/IO (input-output) is available to continue.

Additionally, the "when to measure" part of the power assertion specification can be defined by e) a design state derived directly from the state of a power controller. A power controller is a term used to describe logic blocks in SoC/IP designs that switch power on/off to other logic blocks, as well as perform dynamic voltage and/or frequency scaling. A power controller may be referred to by other names such as "power management circuit", "power management block", etc. The state of a power controller refers to the state of configuration registers in the power controller based on which it can be determined which controlled logic blocks are switched on or off, as well as if those controlled logic blocks are switched on, what is the voltage and clock frequency these controlled logic blocks are currently operating on.

The "when to measure" part of the power assertion specification can also be defined by f) a combination of two or more of above methods a) through e).

The "expected result of measurement" (or predicted power consumption) part of a power assertion specification can be defined by multiple methods, including, but not limited to items a) through c) listed below.

a). an absolute specification (for example as milliwatts, average toggle count per cycle, total energy/toggles over specified duration, or total energy/toggles for complete state corresponding to an individual trigger). This can be specified either as a maximum limit (assertion reported if limit is exceeded), or as a range (assertion reported if measurement falls outside specified range).

b). a relative specification (as percentage of another power profile in a different mode), and again either as a maximum limit or a range. A different mode can refer to the absolute specification or the predicted power specification. For example, power in relative specification in "idle mode" for an IC design may be less than 2% of power in absolute specification in "active mode" for an IC design.

c. Predicted power specification—where user defines an equation in terms of one or more critical power signals. An example of such an equation is:

Predicted-Power=Weight1*CritSig1+Weight2*(CritSig2*A* && CritSig2*B*)

A power assertion validation tool checks that actual power matches Predicted-Power within certain percentage, or within certain absolute difference (specified in say mW).

Expected measurements can be dependent on foundry technology used for device manufacturing. Hence, the power assertion specification-can be separated in two sections:

First section is definition of technology-dependent variables for which a different value can be specified for each new foundry technology.

Second section is the detailed power assertion specification, which is technology independent, and which refers to technology-specific data only by reference to variables as defined in the first part.

Examples of Power Assertions

Examples of power assertions included in the power assertion specification in the present technology are provided below. Exact syntax of power assertion is subject to modification based on whether a power assertion is implemented in System Verilog, in UPF, or in another existing or new language.

In one embodiment of the present technology, a new power assertion language can be based on Tcl, where Tcl is a high-level, general-purpose, interpreted, dynamic programming language. Representative pseudo description of a Tcl-based new power assertion language is illustrated below.

Example 1

Average Power consumed in Block Top.A1.B2 during 1000 cycles subsequent to trigger of Top.A1.B2.engineOn signal is no more than 100 mW.

Pseudo-Code:
CreatePowerAssertion-name
BlkXYZ_EngineOn_1000cycle \
　blockHier Top.A1.B2
　posedge_trigger Top.A1.B2.engineON
　trigger_window {0 1000}
　power_metric AVG_POWER
　high_threshold 0.1 where, "-name" specifies unique name for power assertion to use for purpose of reporting power assertion failures. Other fields are specific to types of power assertion being created and are defined by software implementation specification for the specific embodiment of the present technology.

In the above example, power metric being measured is average power inside block "Top.A1.B2" starting from each positive edge on "Top.A1.B2.engineON" and measured for next 1000 cycles. Power assertion (failure) is triggered if average power exceeds 0.1 (Watt). It is implied that tool will filter out and not check assertion on glitch edges but only actual edges of the specified signal.

Example 2

Average Power consumed in Block Top.A1.B2 matches predicted power within 10%.

Pseudo-Code:
CreatePredictedPowerMetric-name BlkXYZ_Predict_Cycle1\
　expr {0.45*Top.A1.sig1+1.79*Top.A2.sig2}
CreatePowerAssertion-name
BlkXYZ_Cycle1_MAVG100 \
　blockHier Top.A1 power_metric CYCLE POWER
predicted_metric BlkXYZ_Predict_Cycle1
metric_method {MAVG 100}
metric_threshold {0.90 1.10}
metric_window 10
where, "-name" specifies unique name for power assertion to use for purpose of reporting power assertion failures. Other fields are specific to types of power assertion being created, and are defined by software implementation specification for the specific embodiment of the present technology.

In the above example, power metric being measured is power-vs-time inside block "Top.A1" and measured as moving average over prior 100 cycles. It is compared with predicted power as defined by preceding definition named BlkXYZ_Predict_Cycle1. If measured power is outside the (90%-110%) of predicted power, a power assertion failure is reported. A power assertion failure requires that assertion violation occurs over at least 10 successive cycles. Violations shorter than 10 cycles are transient and ignored.

The power assertion specification can include a plurality of power assertions, where each power assertion can be categorized based on importance according to which the power assertion is reported. As shown in example 3 below, a power assertion can be categorized based on importance using fields named "-severity" and "-weight" in a pseudo code for an EDA tool, such as an IC design refinement tool (108, FIG. 1).

Example 3

Average Power consumed in each instance of memory block MEM32KX8LH during any 1000 cycle of primary clock of such memory does not exceed 5 mW.
Pseudo-Code:
CreatePowerAssertion-name
MEM32KX8LH_AVGPWR\
  template
    MEMLIB1.MEMORY_INST_AVERAGE_POWER
  template_args Top.A1 MEM32KX8LH 1000 5e-3
  severity medium-weight 5-message "description text for design and verification engineers"
  autofix method MEMLIB1.EnableEquivMemorySwap
  autofix_args   MEM32KX8UL   MEM16KX8LH
    MEM16KX8UL
where, a field named "-name" specifies unique name for power assertion to use for purpose of reporting a power assertion result. A field named "-template" allows designer to use assertion checks defined in a separate assertion check library or assertion checks natively supported by the assertion validation tool. A field named '-template_args" allows customizing such predefined assertion check for the individual context of IP design where it is used. Fields named "-severity" and "-weight" are typically used to indicate relative priority of different assertion failures, as well as to generate a cumulative assertion failure score based on all failed assertions. A field named "-message" provides further textual guidance to design engineers and verification engineers to understand the purpose of assertion check, possible cause of failure and potential fixes available. An optional field "-autofix method" identifies the IC design refinement tool method (e.g. MEMLIB1.EnableEquivMemorySwap) that could be used to fix this assertion failure, while an optional field "-autofix_args" specifies context-specific data required by such IC design refinement tool method.

In this example, the context-specific data (e.g. memory blocks MEM32KX8UL MEM16KX8LH MEM16KX8UL) are functionally equivalent to the IP design (e.g. memory block MEM32KX8LH), but can have different power efficiencies than the IP design. An IC design refinement tool can determine whether one of the memory blocks in the context-specific data can match the power assertion including a predicted power consumption (e.g. "average power consumed in each instance of a memory block during any 1000 cycle of a primary clock of such memory does not exceed 5 mW"), considering the specified severity (e.g. "medium") and the specified weight (e.g. "5"). If so, the IC design refinement tool can swap the IP design for one of the memory blocks in the context-specific data that matches the predicted power consumption.

Example 3 shows the following features:
1. Support of an assertion check library so that users can leverage previously defined assertions, rather than defining each assertion from scratch;
2. Guidance for user to understand relative severity or importance of assertion checks. For example, a design team may allow users to sometimes waive assertions with low severity; and
3. Linking a user-guided fix method or a fully-automatic fix method to each individual power assertion definition.

Figure 3:
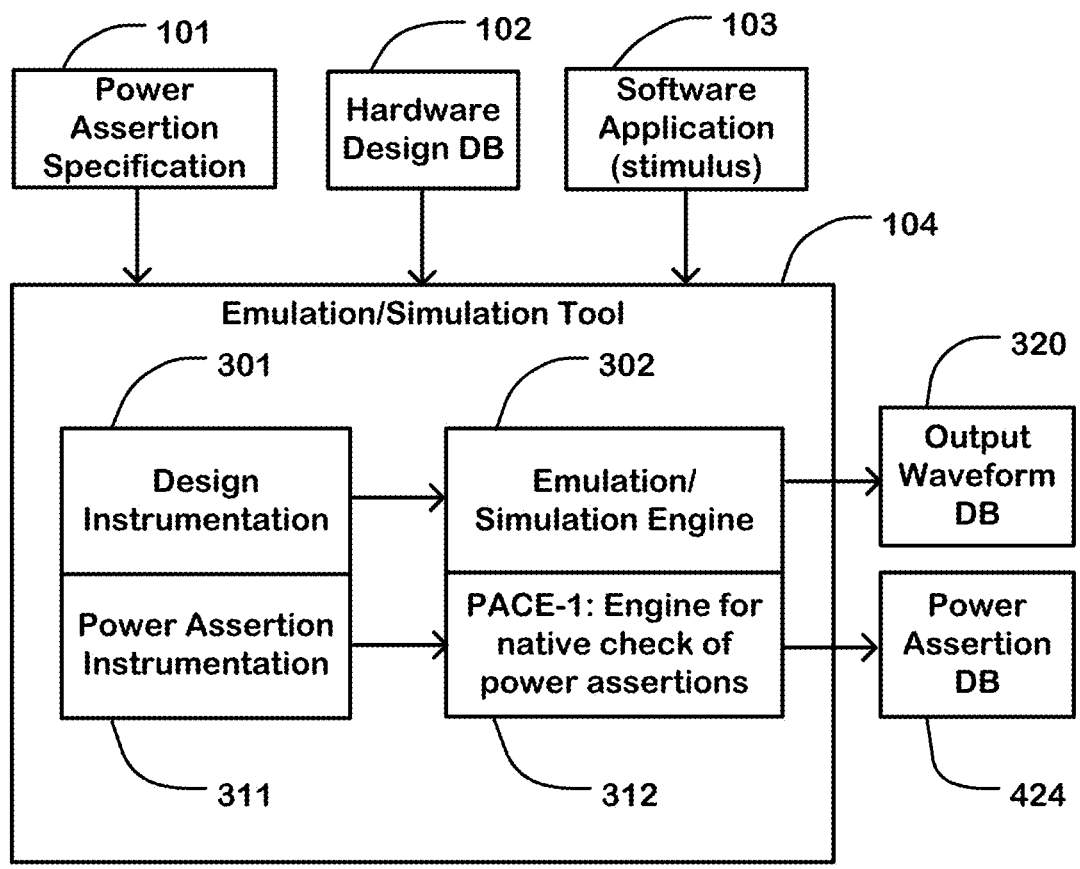
FIG. 3 depicts an emulation/simulation tool as shown in FIG. 1.

FIG. 3 depicts an emulation/simulation tool as shown in FIG. 1. An emulation/simulation tool 104 includes design instrumentation 301 for emulation/simulation, power assertion instrumentation 311 for emulation/simulation, emulation/simulation engine 302, and a companion engine PACE-1 312 to the emulation/simulation engine 302. PACE stands for "power assertion checking engine," which has different variants. PACE variants are fine-tuned to check different types of metrics, ranging from as an example a simple metric measuring toggle count vs. as an example a complex equation metric measuring estimated power vs. predicted power equation. PACE variants work at different stages of underlying data availability, for example, waveform data vs. power-date based on physical inputs. PACE variants need significant performance tuning in order to check metrics for billions of clock cycles over billions of logic cells, hence, the need to implement different metrics at different stages of flow. PACE engines are implemented as companion engines to original simulation/emulation/power calculation engines so as to minimize performance or hardware cost impact to original engines. PACE engines are coupled strongly with original engines, and hence, are dubbed as companion engines. However, implementation of companion engines can vary based on product development preferences of different companion engines.

Emulation/simulation engine 302 can optimize a design netlist for purposes of emulation and simulation and hence, does not preserve and/or output waveform for every logical signal in the design netlist. Performance of an emulation/simulation engine can be severely degraded if the emulation/simulation engine has to preserve and output each of such logical signals. Instead an emulation/simulation engine only outputs a subset of designs signals (example, register and memory outputs) which are sufficient to reconstruct other signals.

An IC design can be represented by an optimized netlist that includes a subset of design signals in the IC design, and the power assertion specification can include a predicted toggle rate. As used herein, a toggle rate can refer to an irregular rate of toggle counts of a signal over multiple time windows in terms of clock cycles. For example, a signal can have 5 toggles in one 100-clock-cycle window, and then 20 toggles in the next 100-clock-cycle window. Simulation/ emulation of the IC design can be executed using the optimized netlist stored in a hardware design database in the computer system 102 to output waveforms for the subset of design signals. The PACE-1 engine can calculate toggle rate of signals in the subset of design signals during the operation for executing simulation/emulation, using the output waveforms for the subset of design signals, for a subset of the power assertions specified in the power assertion specification dependent on the signals in the subset of design signals. The PACE-1 engine can compare the calculated toggle rate of the signals in the subset of design signals against a predicted toggle rate of the signals for the subset of the power assertions during the operation for executing simulation/emulation. The output waveforms for the subset of design signals can be stored in an output waveform database 320.

Design instrumentation 301 refers to compilation of a hardware design from the hardware design database (DB) 102 (FIG. 1), such as in a hardware description language like Verilog, into simulator object code so that it can be executed by a simulator, or into an FPGA (Field Programmable Gate Arrays) mapped netlist so that it can be executed by an FPGA-based emulator.

Power assertion instrumentation 311 refers to compilation of the power assertion specification 101 into a simulator compiled code or emulator "FPGA mapped netlist" code so that the power assertion specification can be natively checked by an emulation/simulation engine 302, using native data-model of a simulator or an emulator.

Emulation/simulation engine 302 can execute a compiled hardware design by design instrumentation 301, using software application (stimulus) 103 (FIG. 1) and native data-model of a simulator or an emulator. The PACE-1 engine can check toggle and similar metrics which can be implemented locally with minimal performance or hardware cost. Below is an example of a power assertion for the PACE-1 engine:

Assert "Toggle Count of signal Top.blk1.Reg2" (when) "over any period of 100 cycles of clock Top.blk1.CLK1"
"Does not exceed 30 percent"

This power assertion asserts no more than 30 toggles of a signal "Top.blk1.Reg2" for 100 active edges of a clock signal Top.blk1.CLK1. More specifically, the power assertion is specified in the power assertion specification (101, FIG. 1). The "what to measure" part of the power assertion "Toggle Count of signal Top.blk1.Reg2" is measured by the emulation/simulation engine 302. The "when to measure" part of the power assertion "over any period of 100 cycles of clock Top.blk1.CLK1", and the "expected result of measurement" part of the power assertion "Does not exceed 30 percent" are executed by the PACE-1 engine 312.

The emulation/simulation engine 302 can store the waveform output for the subset of design signals in an output waveform database (DB) 320 in the computer system. The PACE-1 engine has read/write access to a power assertion database (DB) 424 (FIG. 4).

Figure 4:
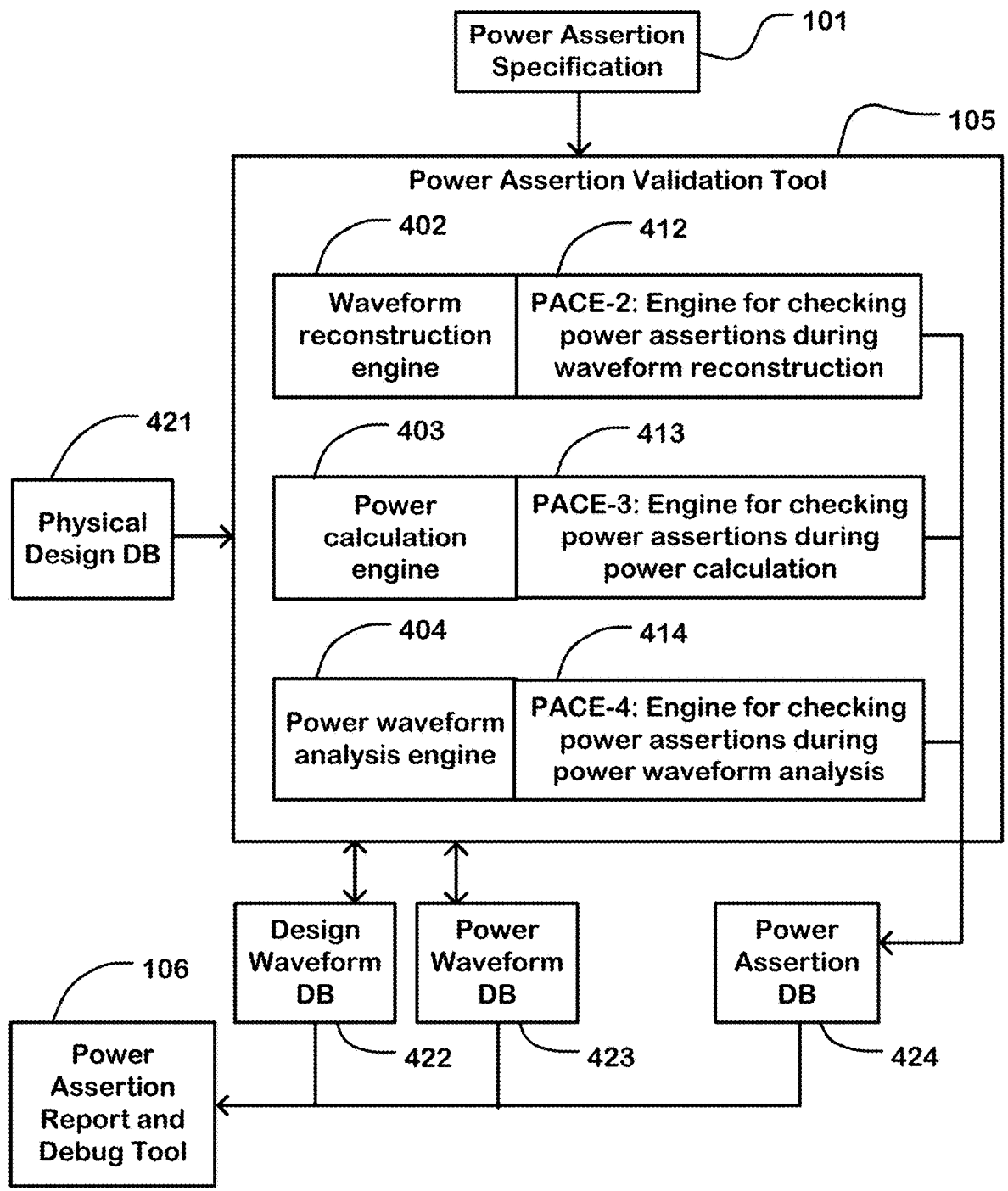
FIG. 4 depicts a power assertion validation tool as shown in FIG. 1.

FIG. 4 depicts a power assertion validation tool 105 as shown in FIG. 1. A power assertion validation tool 105 includes waveform reconstruction engine 402, power calculation engine 403, and power waveform analysis engine 404, and respective companion engines PACE-2 412, PACE-3 413 and PACE-4 414. PACE signifies power assertion checking engine.

The PACE-2 engine is a companion engine to waveform reconstruction engine 402, and can check toggle count and similar power metrics which need reconstructed waveforms or conditionals that may be sub-optimal to implement in the PACE-1 engine. As explained for the PACE-1 engine in reference to FIG. 3, an IC design can be represented by an optimized netlist that includes a subset of design signals in the IC design, and the power assertion specification can include a predicted toggle rate. The PACE-2 engine can reconstruct signals in the IC design that are not in the subset of design signals, using the output waveforms for the subset of design signals from the PACE-1 engine stored in the output waveform database in the computer system. For example, a signal defined as "X=Reg1 && Reg2" can be reconstructed by the PACE-2 engine if waveforms of signals "Reg1" and "Reg2" is available, for example, from the output of the PACE-1 engine.

The PACE-2 engine can calculate toggle rate of the reconstructed signals during the operation for reconstructing the signals, for a subset of the power assertions specified in the power assertion specification dependent on the reconstructed signals. The PACE-2 engine can compare the calculated toggle rate of the reconstructed signals against a predicted toggle rate of the signals for the subset of the power assertions during the operation for reconstructing the signals.

Below is an example of a power assertion for the PACE-2 engine:

Assert "Toggle Count of DERIVED signal Top.blk1.Reg3 && Top.blk2.Reg5; AND FSM(F1) state "BURST" (when) "over any period of 100 cycles of clock Top.blk1.CLK1"
Does not exceed 10 percent This power assertion asserts no more than 10 toggles of a derived signal "Top.blk1.Reg3 && Top.blk2.Reg5" in the "BURST" FSM (Finite State Machine) state for 100 active edges of a clock signal Top.blk1.CLK1. More specifically, the power assertion is specified in the power assertion specification (101, FIG. 1). A derived signal "Top.blk1.Reg3 && Top.blk2.Reg5" is reconstructed, and the "BURST" FSM state is based on a finite state machine (FSM), in the waveform reconstruction engine 402. The "what to measure" part of the power assertion "Toggle Count" is measured by the PACE-2 engine 412. The "when to measure" part of the power assertion "over any period of 100 cycles of clock Top.blk1.CLK1", and the "expected result of measurement" part of the power assertion "Does not exceed 10 percent" are executed by the PACE-2 engine 412.

PACE-3 413 is a companion engine to power calculation engine 403, and can check power metrics which depend on power computation and cannot be checked by the PACE-1 and PACE-2 engines. Output design waveforms from the emulation/simulation engine 302 and the waveform reconstruction engine 402 are stored in design waveform DB 422. Design waveforms are waveforms of digital signals. A digital signal is a signal that is used to represent data as a sequence of discrete values. The power calculation engine 403 is based on design waveforms (digital waveforms) from design waveform DB 422 and physical design data (placement data) from physical design DB 421. The power calculation engine 403 have read/write access to design waveform database 422 for the design waveforms, and have read/write access to physical design database 421 for physical design data. The PACE-3 engine can calculate power consumption in a circuit block in the IC design using design waveforms stored in a design waveform database (422, FIG. 4) in the computer system and physical design data stored in a physical design database (421, FIG. 4) in the computer system, for a subset of power assertions specified in the power assertion specification dependent on the circuit block. The PACE-3 engine can compare the calculated power consumption of the circuit block against a predicted power consumption for the subset of power assertions during the operation for calculating power consumption.

Below is an example of a power assertion for the PACE-3 engine:

Assert 'Dynamic Average Power of Top.blk1+Top.blk2 when FSM(F1) state "BURST" (when) "over any period of 1000 cycles of clock Top.blk1.CLK1"
"Does not exceed 100 uWatts"

This power assertion asserts no more than 100 uWatts of power consumption for two circuit blocks "Top.blk1+Top.blk2" in an IC design in the "BURST" FSM state over any period of 1000 cycles of a clock signal Top.blk1.CLK1. More specifically, the power assertion is specified in the power assertion specification (101, FIG. 1). The "what to measure" part of the power assertion "Dynamic Average Power" is measured by the power calculation engine 403. The "when to measure" part of the power assertion "over any period of 1000 cycles of clock Top.blk1.CLK1", and the "expected result of measurement" part of the power assertion "Does not exceed 100 uWatts" (uWatts=micro Watts) are executed by the PACE-3 engine 413.

PACE-4 414 is a companion engine to power waveform analysis engine 404, and can check power metrics which are temporal in nature. Hence, checking those power metrices at earlier stages may be sub-optimal or not feasible when dealing with large data-sets. For instance, prior stages using PACE-1, PACE-2 and/or PACE-3 engines can be implemented in architecture flow using distributed engines. Hence, some temporal metric computation may need collation of output from various distributed engines. These metrics will normally be checked by PACE-4 engine. Output power waveforms (analog waveforms) from the power calculation engine 403 and the power waveform analysis engine 404 are stored in power waveform DB 423. Power waveforms are waveforms of analog signals. An analog signal is a continuous signal that represents time varying quantities such as electrical voltage or current. The PACE-4 engine 414 is based on power waveforms (analog waveforms) from power waveform DB 423. The PACE-4 engine 414 has read/write access to power waveform database 423 for the power waveforms. The PACE-4 engine can calculate power consumption in a circuit block in the IC design using power waveforms stored in a power waveform database (423, FIG. 4) in the computer system, for a subset of power assertions specified in the power assertion specification dependent on the circuit block. The PACE-4 engine can compare the calculated power consumption of the circuit block against a predicted power consumption for the subset of power assertions during the operation for calculating power consumption. The PACE-4 engine can use power waveforms to calculate average and peak power metrics including sub-components of the average and peak power metrics such as leakage power, switching power and internal power.

Below is an example of a power assertion for the PACE-4 engine:

Assert 'Dynamic Average Power of Top.blk1+Top.blk2" (when) "over any 10,000 cycles of clock Top.blk1.CLK1"
"Does not exceed 20 uWatts"

This power assertion asserts no more than 20 uWatts of power consumption for two circuit blocks "Top.blk1+Top.blk2" in an IC design over any period of 10,000 cycles of a clock signal Top.blk1.CLK1. More specifically, the power assertion is specified in the power assertion specification (101, FIG. 1). The "what to measure" part of the power assertion "Dynamic Average Power" is measured by the power waveform analysis engine 404. The "when to measure" part of the power assertion "over any 10,000 cycles of clock Top.blk1.CLK1", and the "expected result of measurement" part of the power assertion "Does not exceed 20 uWatts" are executed by the PACE-4 engine 414.

PACE-1, PACE-2, PACE-3 and PACE-4 engines have read/write access to power assertion database (DB) 424 and can access result of prior engines if needed. By way of an example, if a power assertion is defined using a part of a previous power assertion, then a PACE engine can access the power assertion database (DB) 424 to re-use the previous result computed for the previous power assertion and avoid duplicate some of computations.

The power assertion report and debug tool 106 (FIG. 1) has access to the design waveform DB 422, the power waveform DB 423, and the power assertion DB 424.

Figure 5:
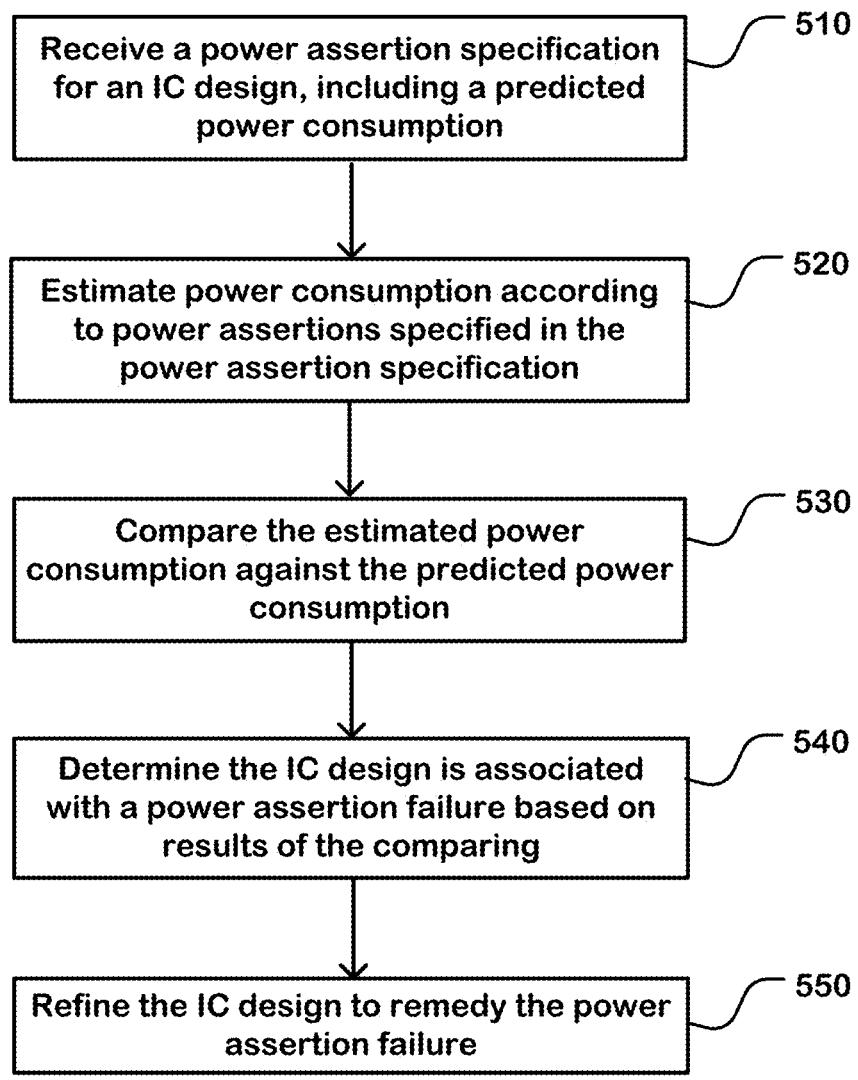
FIG. 5 depicts a flowchart of various operations used in power validation based on a power assertion specification.

FIG. 5 depicts a flowchart of various operations used in power validation based on a power assertion specification. At Operation 510, a power assertion specification is received for an IC design by a processor, where the power assertion specification includes a predicted power consumption. A power assertion specification includes power assertions for what to measure, including expected average power consumption of a circuit block in the IC design, expected peak power consumption of a circuit block in the IC design, expected leakage power, expected switching power and expected internal power of a circuit block in the IC design, and expected toggle rate of a design signal in the IC design.

A power assertion specification includes power assertions for when to measure, including a time period during which to measure power consumption or toggle rate, and a power condition, a power trigger or a design state at which to measure power consumption or toggle rate. A power assertion specification includes power assertions for expected result of measurement, including an absolute specification, a relative specification and a predicted power specification for expected power values.

A power assertion specification includes power assertions for a scope of the IC design within which the power assertion is specified and power measurements are taken. A power assertion specification includes power assertions for a design operation mode in which a circuit block in the IC design operates. A power assertion can specify one or more of what to measure, when to measure, expected result of measurement, a scope of the IC design, and a design operation mode.

At Operation 520, power consumption of the IC design is estimated, by the processor, according to power assertions specified in the power assertion specification. At Operation 530, the estimated power consumption is compared against the predicted power consumption included in the power assertion specification, by the processor. The power assertion specification can include a predicted toggle rate of a design signal in the IC design. Toggle rate is indicative of power consumption. Power consumption is a physical quantity measured in Joules over time or Watts.

The IC design can be represented by an optimized netlist that includes a subset of design signals in the IC design, and the power assertion specification can include a predicted toggle rate of a design signal. Emulation/simulation of the IC design can be executed using the optimized netlist stored in a hardware design database to output waveforms for the subset of design signals. At Operation 520, toggle rate of signals in the subset of the design signals can be calculated during the operation for executing emulation/simulation, using the output waveforms for the subset of design signals, for a subset of the power assertions specified in the power assertion specification dependent on the signals in the subset of design signals. At Operation 530, the calculated toggle rate of the signals in the subset of design signals can be compared against a predicted toggle rate of the signals included in the power assertion specification for the subset of the power assertions during the operation for executing emulation/simulation. The output waveforms for the subset of the design signals can be stored in an output waveform database (320, FIG. 3).

Signals in the IC design that are not in the subset of design signals can be reconstructed, using the output waveforms for the subset of design signals stored in the output waveform database. At Operation 520, toggle rate of the reconstructed signals can be calculated during the operation for reconstructing the signals, for a subset of the power assertions specified in the power assertion specification dependent on the reconstructed signals. At Operation 530, the calculated toggle rate of the reconstructed signals can be compared against a predicted toggle rate of the signals for the subset of the power assertions dependent on the reconstructed signals during the operation for reconstructing the signals.

At Operation 520, power consumption in a circuit block in the IC design can be calculated using design waveforms stored in a design waveform database and physical design data stored in a physical design database, for a subset of power assertions specified in the power assertion specification dependent on the circuit block. At Operation 520, the calculated power consumption of the circuit block can be compared against a predicted power consumption for the subset of power assertions during the operation for calculating power consumption.

At Operation 520, power consumption in a circuit block in the IC design can be calculated using power waveforms stored in a power waveform database, for a subset of power assertions specified in the power assertion specification dependent on the circuit block. At Operation 530, the calculated power consumption of the circuit block can be compared against a predicted power consumption for the subset of power assertions during the operation for calculating power consumption.

At Operation 540, the IC design can be determined to be associated with a power assertion failure based on results of the comparing operation by the processor. For instance, a power assertion failure can occur when a measured power consumption value for a design signal or a circuit block does not match an expected power consumption value in a power assertion for the design signal or the circuit block.

At Operation 550, in response to determining that the IC design is associated with the power assertion failure, the IC design can be refined to remedy the power assertion failure, by the processor. The results of the comparing operation 530 can be stored in a power assertion database (424, FIG. 4), and the power assertion failure determined at the determining operation 540, along with power assertion successes, can be reported based on the results stored in the power assertion database. The power assertion successes can also be determined at the determining operation 540, and reported based on the results stored in the power assertion database. For instance, a power assertion success can occur when estimated power consumption of a circuit block matches a predicted power consumption in a power assertion for the circuit block. For instance, a power assertion success can occur when a calculated toggle rate of a design signal matches a predicted toggle rate of the design signal in a power assertion for the design signal.

Operation 550 to refine the IC design can include generating, by the processor, directives to remedy the power assertion failure in a part of the IC design associated with the power assertion failure, by either a user-guided semi-automatic method or a fully automated method. The directives to refine an IC design can include synthesis directives, clock-gating directives, and placement directives to remedy the power assertion failure. By way of an example, a synthesis directive can select a more power-efficient version of design macros such as arithmetic components, specified by a "power_enable_minpower" switch in an EDA (Electronic Design Automation) tool. By way of an example, a clock-gating directive can finetune parameters used for clock-gating command, also controlled by a set of power related commands (e.g. "power cg *") in an EDA tool, for an applicable part of an IC design. By way of an example, placement directives can place logic instances closer to each other, specified by a "power_low_power_placement" switch in an EDA tool. The directives to refine an IC design can include, by way of an example, generating switching activity data based on failed assertions, which help synthesis and implementation EDA tools to further prioritize switching activity of an applicable part of an IC design for such failed assertions. The directives to refine an IC design can include, by way of an example, generating information about design part and design mode in which such block should have been switched off, and hence, isolation logic is inserted based on the directives. In general, there is a detailed method to prioritize power effort, power mode and power-centric QoR (Quality of Results) strategy when implementing an applicable part of an IC design, and power assertion results can guide selective and optimal use of such strategy.

Refining the power assertion specification can include generating, by the processor, more accurate predicted power consumptions for failed power assertions for applicable design parts and design modes, such that subsequent power validation can be performed based on thus corrected versions of a power assertion specification.

A power assertion tool, such as a power assertion refinement tool 107, an IC design refinement tool 108, a software application refinement tool 109 (FIG. 1), can provide directives to remedy the power assertion failure in the IC design, in the power assertion specification and/or in the software application and stimulus code. For example, the directives may include a clock-gating method, or a synthesis directive to select design macros based on power efficiency, or a placement directive to optimize power QoR (Quality of Results) for certain design sections in the IC design. Such directives can be applied to the IC design, to the power assertion specification and/or to the software application and stimulus code, using the reported power assertion failure generated by the power validation based on a power assertion specification as described herein.

Figure 6:
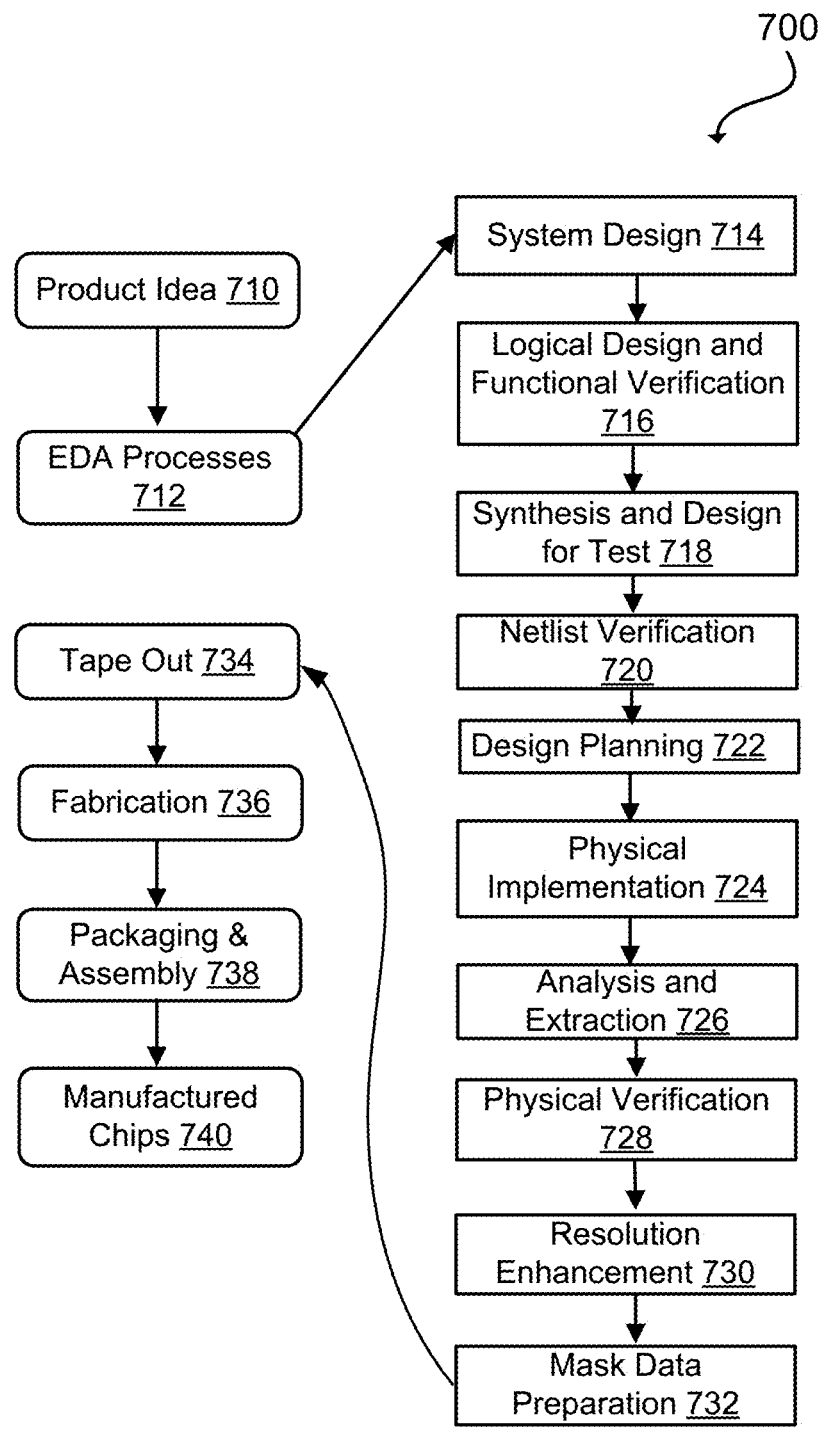
FIG. 6 depicts a flowchart of various processes used during the design and manufacture of an integrated circuit in accordance with some embodiments of the present disclosure.

FIG. 6 depicts a flowchart of various processes used during the design and manufacture of an integrated circuit in accordance with some embodiments of the present disclosure. FIG. 6 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 6. The processes described are enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 8, or host system 807 of FIG. 7) may be used to store the programs and data structures that are used by some or all of the EDA products described herein, and products used for development of cells for the library and for physical and logical design that use the library.

Figure 7:
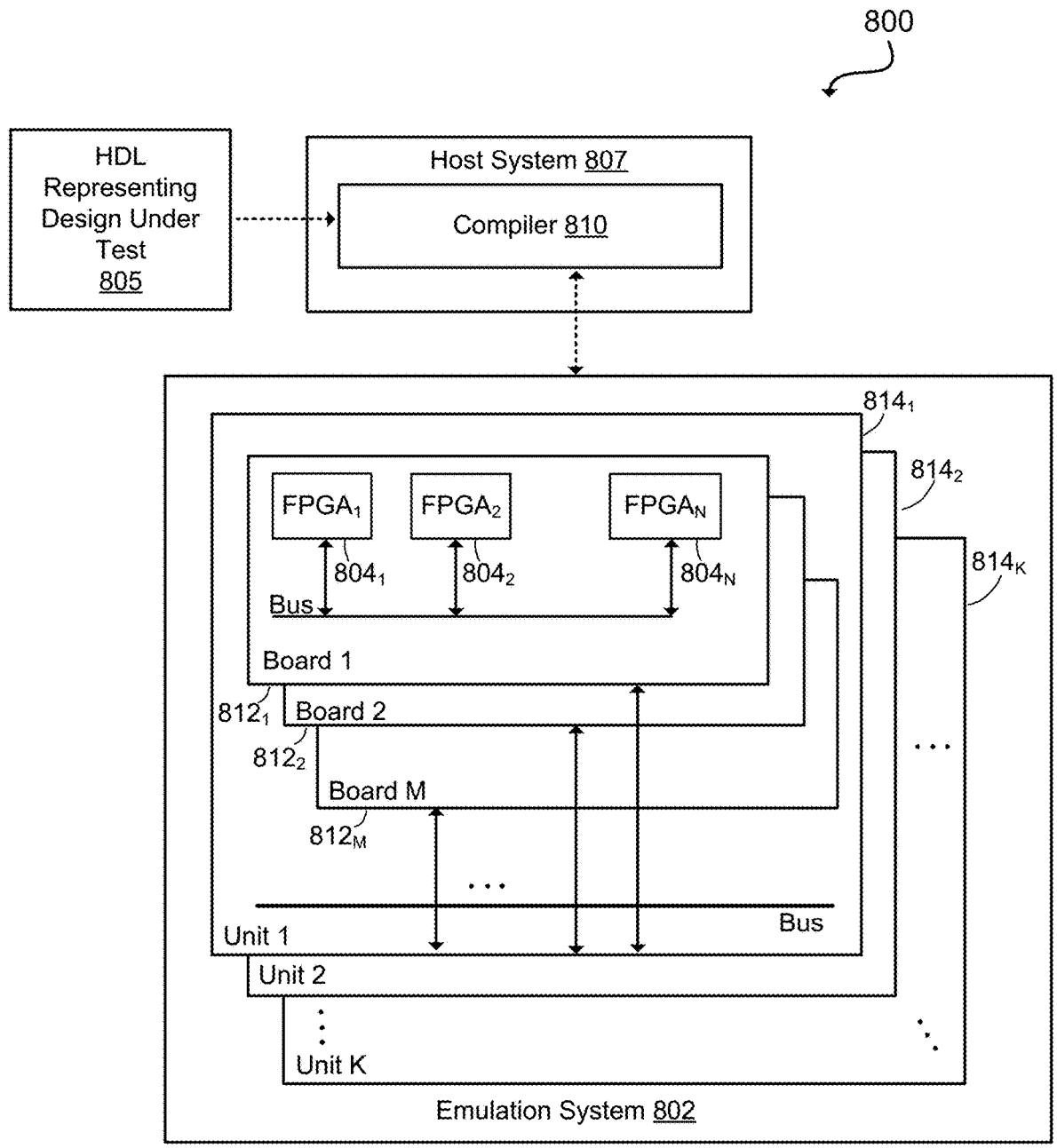
FIG. 7 depicts an abstract diagram of an example emulation system in accordance with some embodiments of the present disclosure.

FIG. 7 depicts an abstract diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a DUT (Design Under Test) where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs $804_1$ and $804_2$ as well as additional FPGAs to $804_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs (Application Specific Integrated Circuit) for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$. The boards within an emulation unit can be connected using the backplane of the emulation unit or any other types of connections. In addition, multiple emulation units (e.g., $814_1$ and $814_2$ through $814_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic.

The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 8:
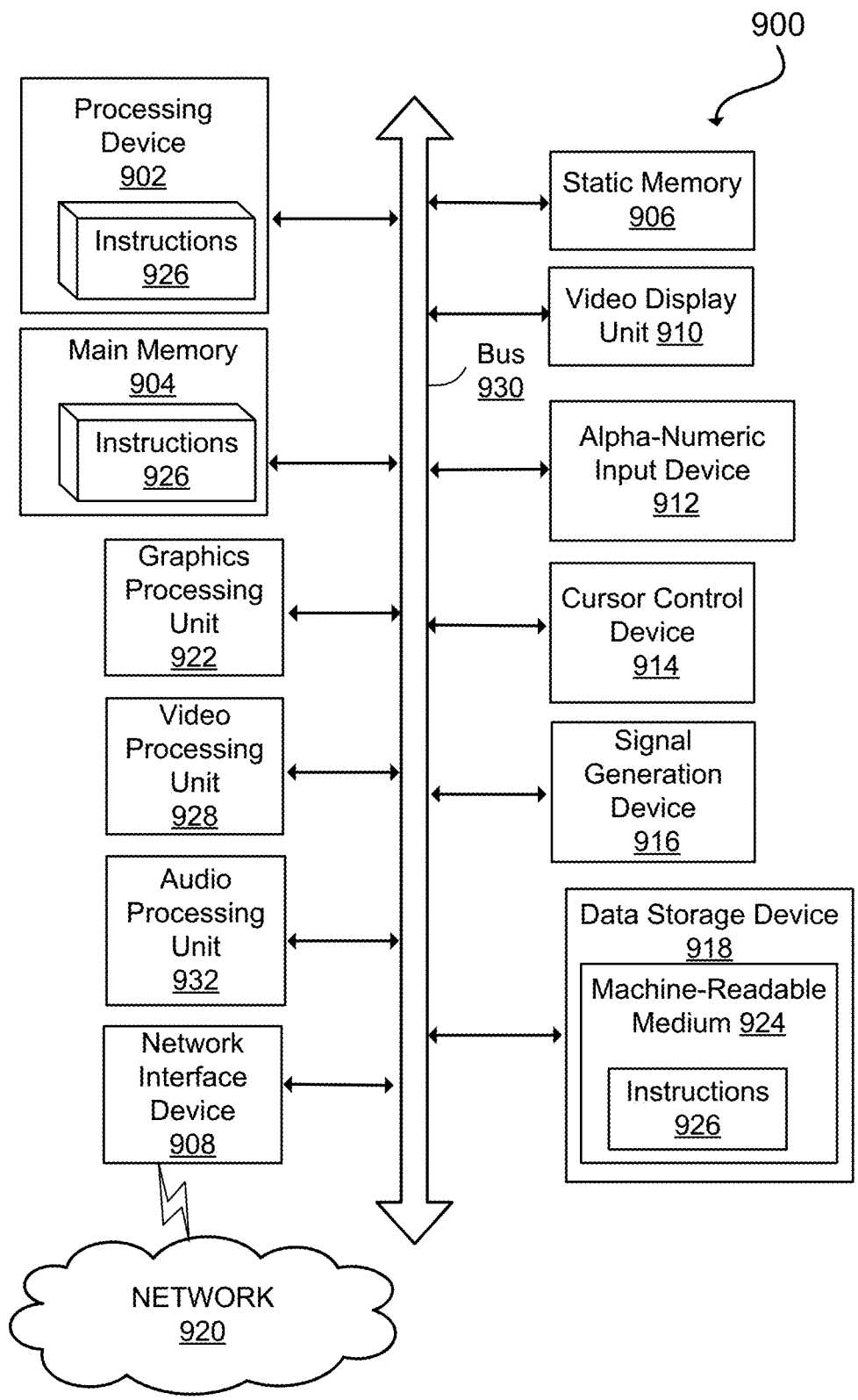
FIG. 8 depicts an abstract diagram of an example computer system in which embodiments of the present disclosure may operate.

FIG. 8 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

However, all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for performing power validation on an integrated circuit (IC) design based on a power assertion specification, the IC design being represented by a netlist that includes a subset of design signals in the IC design, the method comprising:
   receiving, by a processor, the power assertion specification for the IC design, the power assertion specification including a predicted power consumption;
   executing simulation of the IC design using the netlist to output waveforms for the subset of design signals;
   reconstructing signals in the IC design that are not in the subset of design signals, using the output waveforms for the subset of design signals;
   calculating a toggle rate of the reconstructed signals during the reconstructing of the signals, for a subset of the power assertions specified in the power assertion specification for the reconstructed signals;
   comparing the calculated toggle rate of the reconstructed signals against a predicted toggle rate of the reconstructed signals for the subset of the power assertions specified during the reconstructing of the signals;
   determining that the IC design is associated with a first power assertion failure based on results of the comparing the calculated toggle rate of the reconstructed signals against a predicted toggle rate of the reconstructed signals;
   estimating, by the processor, power consumption of the IC design according to power assertions specified in the power assertion specification for the IC design;
   comparing, by the processor, the estimated power consumption against the predicted power consumption included in the power assertion specification for the IC design;
   determining, by the processor, that the IC design is associated with a second power assertion failure based on results of the comparing the estimated power consumption against the predicted power consumption; and
   in response to determining that the IC design is associated with one or more of the first and the second power assertion failures, refining, by the processor, the IC design to remedy the one or more of the first and the second power assertion failures.

2. The method of claim 1, said refining comprising:
   generating, by the processor, directives to remedy the one or more of the first and the second power assertion failures in a part of the IC design associated with the one or more of the first and the second power assertion failures.

3. The method of claim 2, wherein the directives include synthesis directives, clock-gating directives, and placement directives to remedy the one or more of the first and the second power assertion failures.

4. The method of claim 1, further comprising:
   storing the results of said comparing the estimated power consumption against the predicted power consumption in a power assertion database; and
   reporting the one or more of the first and the second power assertion failures, along with power assertion successes, based on the results stored in the power assertion database.

5. The method of claim 1, further comprising:
   calculating a toggle rate of signals in the subset of design signals during said executing simulation, using the output waveforms for the subset of design signals, for a subset of the power assertions specified in the power assertion specification for the signals in the subset of design signals; and
   comparing the calculated toggle rate of the signals in the subset of design signals against a predicted toggle rate of the signals in the subset of design signals for the subset of the power assertions specified during said executing simulation;
   determining that the IC design is associated with a third power assertion failure based on results of the comparing the calculated toggle rate of the signals in the subset of design signals against a predicted toggle rate of the signals in the subset of design signals.

6. The method of claim 5, wherein the power assertion specification includes the predicted toggle rate of the signals in the subset of design signals for the subset of the power assertions specified.

7. The method of claim 1, wherein
   said estimating comprises calculating power consumption in a circuit block in the IC design using design waveforms stored in a design waveform database and physical design data stored in a physical design database, for a subset of power assertions specified in the power assertion specification for the circuit block; and
   said comparing the estimated power consumption comprises comparing the calculated power consumption of the circuit block against a predicted power consumption of the circuit block for the subset of power assertions specified for the circuit block during said calculating power consumption.

8. The method of claim 1, wherein
said estimating comprises calculating power consumption in a circuit block in the IC design using power waveforms stored in a power waveform database, for a subset of power assertions specified in the power assertion specification for the circuit block; and
said comparing the estimated power consumption comprises comparing the calculated power consumption of the circuit block against a predicted power consumption of the circuit block for the subset of power assertions specified for the circuit block during said calculating power consumption.

9. The method of claim 1, wherein the power assertion specification includes power assertions including expected average power consumption and expected peak power consumption of a circuit block in the IC design.

10. The method of claim 1, wherein the power assertion specification includes power assertions including expected leakage power, expected switching power and expected internal power of a circuit block in the IC design.

11. The method of claim 1, wherein the power assertion specification includes power assertions including expected toggle rate of a design signal in the IC design.

12. The method of claim 1, wherein the power assertion specification includes power assertions including a time period during which to measure power consumption or toggle rate.

13. The method of claim 1, wherein the power assertion specification includes power assertions including a power condition, a power trigger and a design state at which to measure power consumption or toggle rate.

14. The method of claim 1, wherein the power assertion specification includes power assertions including an absolute specification, a relative specification and a predicted power specification for expected power values.

15. The method of claim 1, wherein the power assertion specification includes a plurality of power assertions, each power assertion being categorized based on importance according to which the power assertion is reported.

16. A system comprising:
a memory storing instructions; and
a processor, coupled with the memory and to execute the instructions, the instructions when executed cause the processor to perform operations of:
receiving a power assertion specification for an IC design, the power assertion specification including a predicted power consumption, the IC design being represented by a netlist that includes a subset of design signals in the IC design;
executing simulation of the IC design using the netlist to output waveforms for the subset of design signals;
reconstructing signals in the IC design that are not in the subset of design signals, using the output waveforms for the subset of design signals;
calculating a toggle rate of the reconstructed signals during the reconstructing of the signals, for a subset of the power assertions specified in the power assertion specification for the reconstructed signals;
comparing the calculated toggle rate of the reconstructed signals against a predicted toggle rate of the reconstructed signals for the subset of the power assertions specified during the reconstructing of the signals;
determining that the IC design is associated with a first power assertion failure based on results of the comparing the calculated toggle rate of the reconstructed signals against a predicted toggle rate of the reconstructed signals;
estimating power consumption of the IC design according to power assertions specified in the power assertion specification for the IC design;
comparing the estimated power consumption against the predicted power consumption included in the power assertion specification for the IC design;
determining, by the processor, that the IC design is associated with a second power assertion failure based on results of the comparing the estimated power consumption against the predicted power consumption; and
in response to determining that the IC design is associated with one or more of the first and the second power assertion failures, refining, by the processor, the IC design to remedy the one or more of the first and the second power assertion failures.

17. The system of claim 16, said refining comprising:
generating directives to remedy the one or more of the first and the second power assertion failures in a part of the IC design associated with the one or more of the first and the second power assertion failures.

18. The system of claim 17, wherein the directives include synthesis directives, clock-gating directives, and placement directives to remedy the one or more of the first and the second power assertion failures.

19. The system of claim 16, further comprising:
storing the results of said comparing the estimated power consumption against the predicted power consumption in a power assertion database; and
reporting the one or more of the first and the second power assertion failures, along with power assertion successes, based on the results stored in the power assertion database.

20. A non-transitory computer readable medium comprising stored instructions, which when executed by a processor, cause the processor to perform operations comprising:
receiving a power assertion specification for an integrated circuit (IC) design, the power assertion specification including a predicted power consumption, the IC design being represented by a netlist that includes a subset of design signals in the IC design;
executing simulation of the IC design using the netlist to output waveforms for the subset of design signals;
reconstructing signals in the IC design that are not in the subset of design signals, using the output waveforms for the subset of design signals;
calculating a toggle rate of the reconstructed signals during the reconstructing of the signals, for a subset of the power assertions specified in the power assertion specification for the reconstructed signals;
comparing the calculated toggle rate of the reconstructed signals against a predicted toggle rate of the reconstructed signals for the subset of the power assertions specified during the reconstructing of the signals;
determining that the IC design is associated with a first power assertion failure based on results of the comparing the calculated toggle rate of the reconstructed signals against a predicted toggle rate of the reconstructed signals;
estimating power consumption of the IC design according to power assertions specified in the power assertion specification for the IC design;

comparing the estimated power consumption against the predicted power consumption included in the power assertion specification for the IC design;

determining that the IC design is associated with a second power assertion failure based on results of the comparing the estimated power consumption against the predicted power consumption; and in response to determining that the IC design is associated with one or more of the first and the second power assertion failures, refining, by the processor, the IC design to remedy the one or more of the first and the second power assertion failures.

\* \* \* \* \*